(12) United States Patent
DeBlock et al.

(10) Patent No.: US 12,283,694 B2
(45) Date of Patent: Apr. 22, 2025

(54) PROTECTIVE SULFIDE COATINGS ON SILVER ELECTRODES FOR ELECTROCHEMICAL DEVICES

(71) Applicant: The Government of the United States of America, as represented by the Secretary of the Navy, Arlington, VA (US)

(72) Inventors: Ryan H. DeBlock, Alexandria, VA (US); Jeffrey W. Long, Alexandria, VA (US); Debra R. Rolison, Arlington, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/756,152

(22) Filed: Jun. 27, 2024

(65) Prior Publication Data

US 2025/0006920 A1    Jan. 2, 2025

Related U.S. Application Data

(60) Provisional application No. 63/511,402, filed on Jun. 30, 2023.

(51) Int. Cl.
| | |
|---|---|
| *H01M 4/58* | (2010.01) |
| *H01M 4/04* | (2006.01) |
| *H01M 4/36* | (2006.01) |
| *H01M 50/417* | (2021.01) |
| *H01M 50/423* | (2021.01) |

(Continued)

(52) U.S. Cl.
CPC ....... *H01M 4/5815* (2013.01); *H01M 4/0404* (2013.01); *H01M 4/366* (2013.01); *H01M 50/417* (2021.01); *H01M 50/423* (2021.01); *H01M 50/449* (2021.01); *H01M 2004/028* (2013.01)

(58) Field of Classification Search
None
See application file for complete search history.

(56) References Cited

U.S. PATENT DOCUMENTS

| | | | |
|---|---|---|---|
| 3,582,366 A | 6/1971 | Brieger et al. | |
| 4,303,740 A * | 12/1981 | Petro | G01N 27/3335 204/290.14 |
| 6,372,379 B1 | 4/2002 | Samii et al. | |

(Continued)

OTHER PUBLICATIONS

Deblock et al., U.S. Appl. No. 18/650,512, filed Apr. 30, 2024.
Hatchett et al., J. Phys. Chem. 1996, 100(1), 331-338.
Hatchett et al., J. Phys. Chem. 1996, 100(23), 9854-9859.

*Primary Examiner* — Tracy M Dove
(74) *Attorney, Agent, or Firm* — US Naval Research Laboratory; Joseph T. Grunkemeyer

(57) ABSTRACT

Disclosed herein is a porous substrate having silver and optionally silver oxide and a silver sulfide coating. Also disclosed herein is a battery having a cathode, an anode, and a separator between the cathode and the anode. The cathode includes a substrate having silver and optionally silver oxide and a silver sulfide coating. Also disclosed herein is a method of submerging a substrate having silver and optionally silver oxide in a solution of elemental sulfur in dimethyl sulfoxide to form silver sulfide on the surface of the substrate.

11 Claims, 12 Drawing Sheets

(51) Int. Cl.
   *H01M 50/449*   (2021.01)
   *H01M 4/02*   (2006.01)

(56) References Cited

U.S. PATENT DOCUMENTS

| | | |
|---|---|---|
| 6,682,854 B2 | 1/2004 | Cheiky et al. |
| 12,009,501 B2 | 6/2024 | Deblock et al. |
| 2009/0050487 A1* | 2/2009 | Fang ................. C25D 1/00 |
| | | 205/135 |
| 2018/0138502 A1* | 5/2018 | Oh ................. H01M 10/054 |
| 2022/0091064 A1* | 3/2022 | Gervasio ............. G01N 27/301 |
| 2023/0211408 A1* | 7/2023 | Islam ................ B01D 69/1214 |
| | | 106/1.19 |

* cited by examiner

PROTECTIVE SULFIDE COATINGS ON SILVER ELECTRODES FOR ELECTROCHEMICAL DEVICES

REFERENCE TO RELATED APPLICATIONS

This application claims the benefit of U.S. Provisional Application No. 63/511,402, filed on Jun. 30, 2023. The provisional application and all other publications and patent documents referred to throughout this nonprovisional application are incorporated herein by reference.

TECHNICAL FIELD

The present disclosure is generally related to silver cathodes.

DESCRIPTION OF THE RELATED ART

Silver-oxide batteries are renowned for high power and high energy density, but cyclability and shelf life are poor due to the instability of the silver-oxide cathode (Parker et al., *Journal of DoD Research & Engineering* 2022, 5, AD1185991). Spontaneous and electrochemical degradation of the silver oxide generates mobile silver species that react with the battery separator. In traditional silver-oxide batteries (e.g., silver-zinc), the separator comprises three distinct layers serving different functions: (i.) a nylon separator contacting the silver oxide cathode for electrolyte retention, (ii.) a middle layer of cellophane to react with any labile silver species, and (iii.) a polypropylene separator contacting the zinc to mitigate dendrite growth. This separator system functions adequately for a primary battery, but the ultimate degradation of the cellophane layer limits the long-term cycle life of rechargeable silver-oxide batteries. Additionally, the supply chain for battery-grade cellophane is becoming tenuous, endangering the long-term prospects to manufacture high-performance silver-oxide batteries that power important DoD applications (Beard, Linden's Handbook of Batteries, McGraw-Hill Education, 2019; Fleischer et al., Zinc-Silver Oxide Batteries, John Wiley and Sons, Inc., 1971). These challenges necessitate new strategies for stabilizing the silver oxide within the cathode itself.

SUMMARY OF THE INVENTION

Disclosed herein is an article comprising a porous substrate comprising silver and optionally silver oxide and a silver sulfide coating on at least a portion of the porous substrate.

Also disclosed herein is a battery comprising a cathode, an anode, and a separator between the cathode and the anode. The cathode comprises a substrate comprising silver and optionally silver oxide and a silver sulfide coating on at least a portion of the substrate.

Also disclosed herein is a method comprising providing a solution of elemental sulfur in dimethyl sulfoxide and submerging a substrate comprising silver and optionally silver oxide in the solution to form silver sulfide on the surface of the substrate.

BRIEF DESCRIPTION OF DRAWINGS

A more complete appreciation will be readily obtained by reference to the following Description of the Example Embodiments and the accompanying drawings.

DETAILED DESCRIPTION

Figure 1:
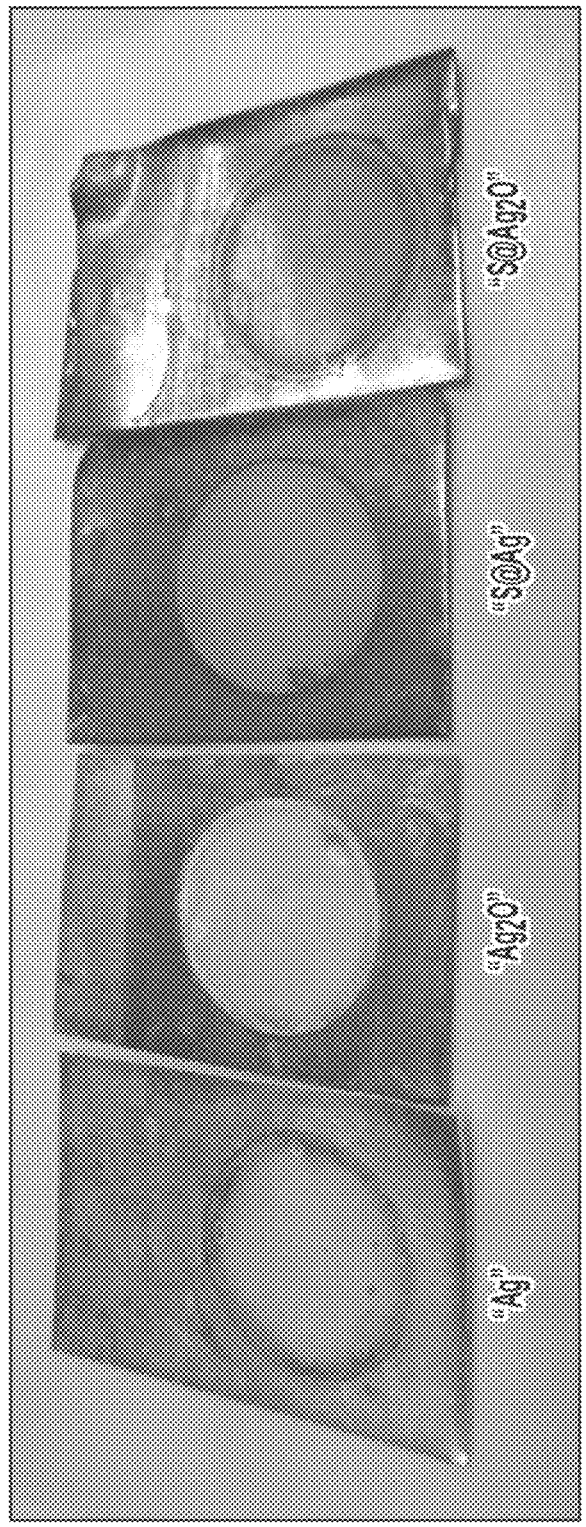
FIG. 1 shows a photograph of silver-foil electrodes before (Ag, $Ag_2O$) and after sulfidization (S@Ag, S@$Ag_2O$). Electrodes finished cycling in the reduced state and active area was limited to the grey circle in the center of each substrate.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is the modification of silver and silver oxide electrodes via the formation of surface layers of silver sulfide ($Ag_2S$) that mitigate chemical and/or electrochemical degradation when used in energy-storage devices. The method involves the application of a thin, sulfidized coating to protect a silver electrode from chemical degradation. Silver sulfide was chosen as a protection layer due to its remarkably low solubility in aqueous media, which prevents continuous dissolution of silver species into the electrolyte, obviating the need for a cellophane separator and significantly increasing electrochemical performance and stability.

In a first step, a solution of elemental sulfur in dimethyl sulfoxide (DMSO) is provided. The concentration of sulfur may be about 0.1 M (based on moles of $S_8$) or any concentration that produces a silver sulfide coating. The solution may contain excess sulfur beyond the solubility limit.

Next, a substrate comprising silver and optionally silver oxide is submerged in the solution. The substrate may be in any physical form, including but not limited to, a porous substrate, a foil, and a non-porous substrate. A porous substrate may be in the form of a powder, which may be formed into an electrode either before or after submersion in the solution.

The submersion may be performed as described herein or by other methods that also produce a silver sulfide coating. The coating may be formed at room temperature or at a temperature below the boiling point of DMSO (about 190° C.). The coating may fully coat the substrate, or may leave some portions uncoated.

The resulting electrode may be used as a cathode in a battery. The cathode may also be made by other methods known in the art that produce a silver sulfide coating. The anode may be any anode suitable for use in a battery with a silver or silver oxide cathode, including a zinc anode. The anode may be porous, including the porous zinc electrodes disclosed in U.S. Pat. Nos. 9,802,254; 10,008,711; 10,720,635; 10,763,500; 10,804,535; 11,069,889; 11,296,373; 11,670,759; and 11,710,818.

The battery includes a separator, which may be any separator suitable for use in such batteries. For example, the separator may comprise a nylon layer in contact with the cathode and a polypropylene layer in contact with the anode. The separator may be free of any cellophane layer that is typically found in the separators of other silver batteries, having only the nylon and polypropylene layers.

The battery may be rechargeable, allowing it to be discharged and recharged repeatedly.

The following examples are given to illustrate specific applications. These specific examples are not intended to limit the scope of the disclosure in this application.

In a typical procedure, 500 mg of elemental sulfur ($S_8$) is added into a 20 mL glass beaker of stirring dimethyl sulfoxide (DMSO) at room temperature. These amounts result in a mixture just past the solubility limit for sulfur, resulting in some excess sulfur powder remaining in the bottom of the beaker. A metal or plastic screen is placed into the beaker and submerged into the DMSO. This screen raises and lowers the substrate to be sulfidized above the bottom of the beaker where the excess sulfur has settled. Substrates suitable for sulfidization in this scheme are foils and monolithic porous silver, either of which may be in their reduced (Ag metal) or oxidized ($Ag_2O$, AgO) states. The substrate for sulfidization is placed on top of the screen, submerged in sulfur/DMSO solution, and is gently agitated on a shaker table for 30 minutes. The substrate is then removed from the sulfidization bath and rinsed with excess DMSO. After drying, the substrate may be further heated in a furnace at 150° C. for 1 hour to remove excess elemental sulfur. Alternatively, powders of silver metal or silver oxide may also be sulfidized by stirring a suspension of the powder of interest in the sulfur/DMSO solution, followed by centrifugation or vacuum filtration to collect the sulfidized powder, followed by rinses with copious amounts of DMSO, and drying.

Figure 2A:
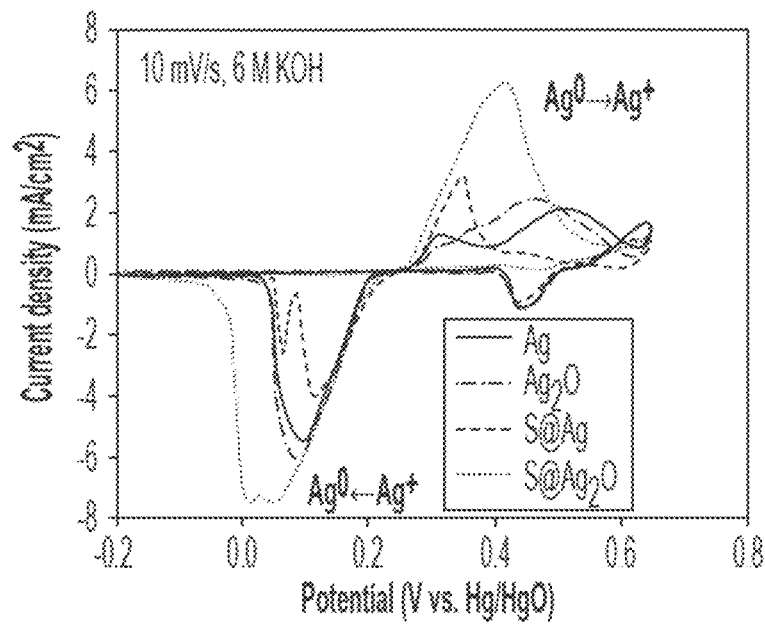
FIGS. 2A-B show cyclic voltammetric response of unmodified and sulfidized silver foil electrodes over the potential window for $Ag^{0/+}$ redox (FIG. 2A) and a restricted potential window that encompasses the region where silver dissolution occurs (FIG. 2B). A three-electrode beaker cell equipped with platinum-wire counter electrode and Hg/HgO reference electrode was used.
Figure 2B:
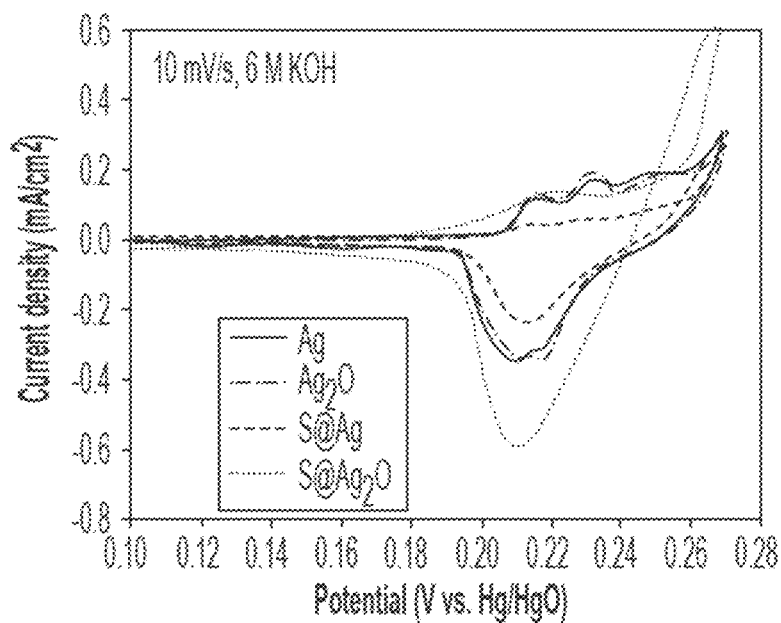

To demonstrate the impact of sulfidization on the electrochemical properties of silver and silver oxide electrodes, silver-foil substrates were prepared with and without the sulfur modification, and with the surface in either its reduced (Ag) or oxidized ($Ag_2O$) form. "$Ag_2O$" and "S@$Ag_2O$" samples were fabricated by first electrochemically oxidizing silver foils by linear sweep voltammetry in 6 M KOH. After preparation, these silver electrodes were cycled voltametrically at 10 mV/s in 6 M KOH electrolyte in a potential range centered around the $Ag^{0/+1}$ redox reaction (FIGS. 1 and 2). Sulfidization produces an iridescent color change at the silver substrate, indicative of a thin coating, and visible on the foil substrate outside of the electrochemically cycled area (FIG. 1). Sulfidized Ag and $Ag_2O$ substrates showed lower polarization and greater peak current density upon oxidation, with S@$Ag_2O$ coatings demonstrating the most significant improvements. Also, unprotected Ag and $Ag_2O$ electrodes exhibit small peaks at ~0.22 and 0.23 V vs Hg|HgO, which have been historically ascribed to silver dissolution events; such features are absent in the voltammetric scans of the sulfidized electrodes (FIG. 2B).

Figure 3A:
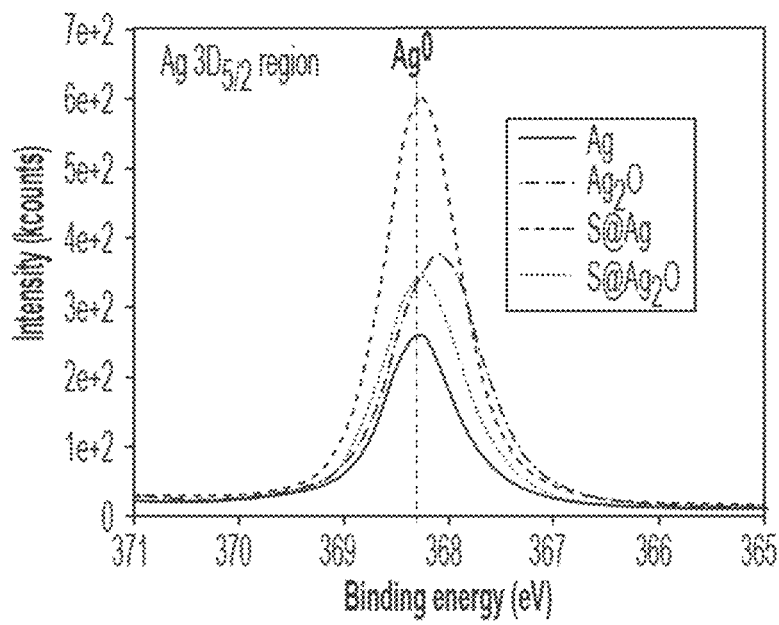
FIGS. 3A-B show X-ray photoelectron spectroscopy (XPS) of uncycled silver-foil electrodes in the Ag $3d_{5/2}$ region (FIG. 3A) and the S 2p region (FIG. 3B).
Figure 3B:
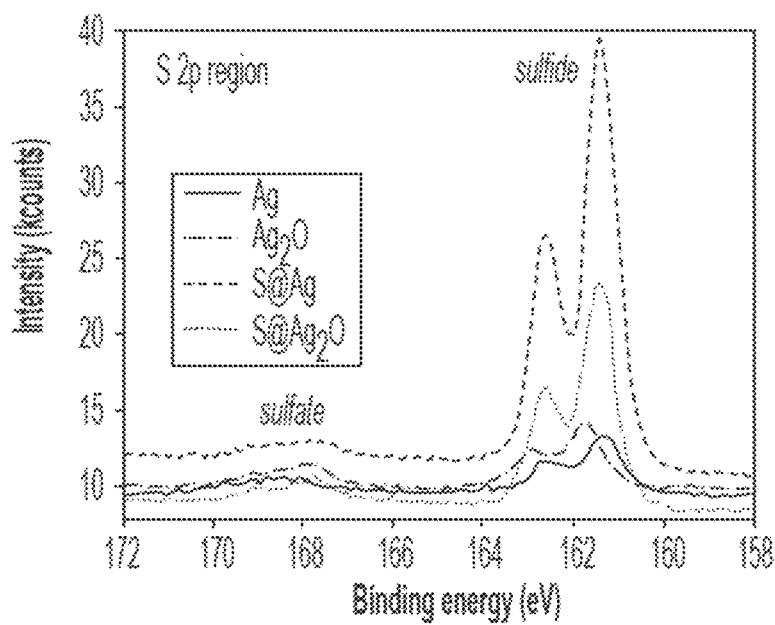
Figure 4A:
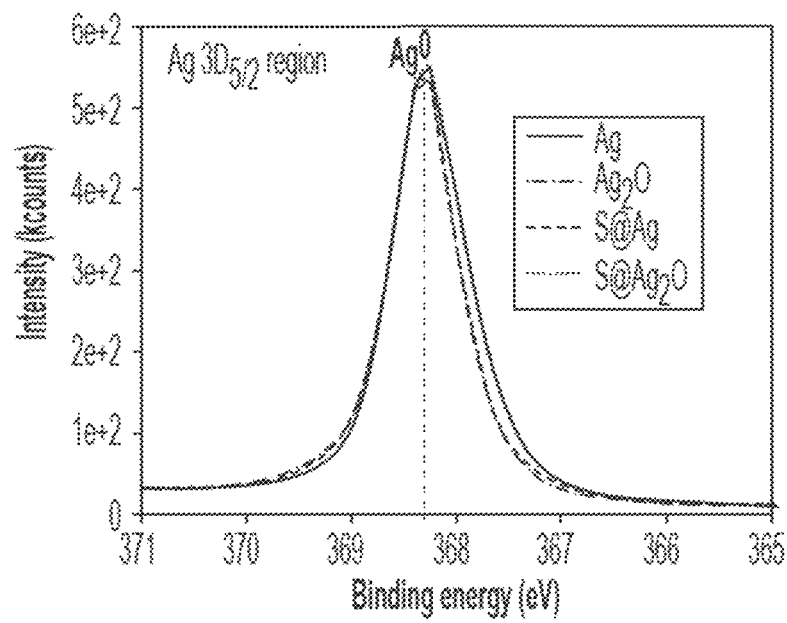
FIGS. 4A-B show post-cycling X-ray photoelectron spectroscopy (XPS) of silver foil electrodes in the Ag $3d_{5/2}$ region (FIG. 4A) and the S 2p region (FIG. 4B).
Figure 4B:
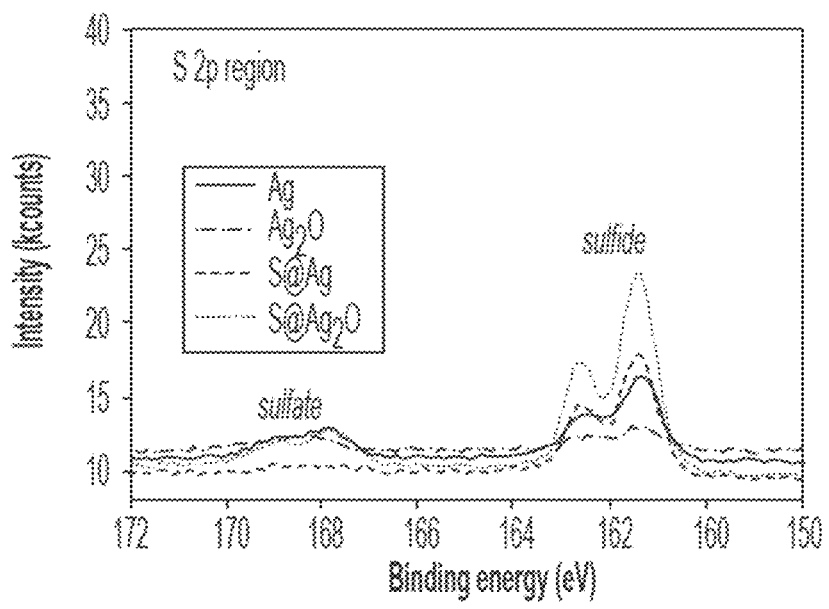
Figure 5:
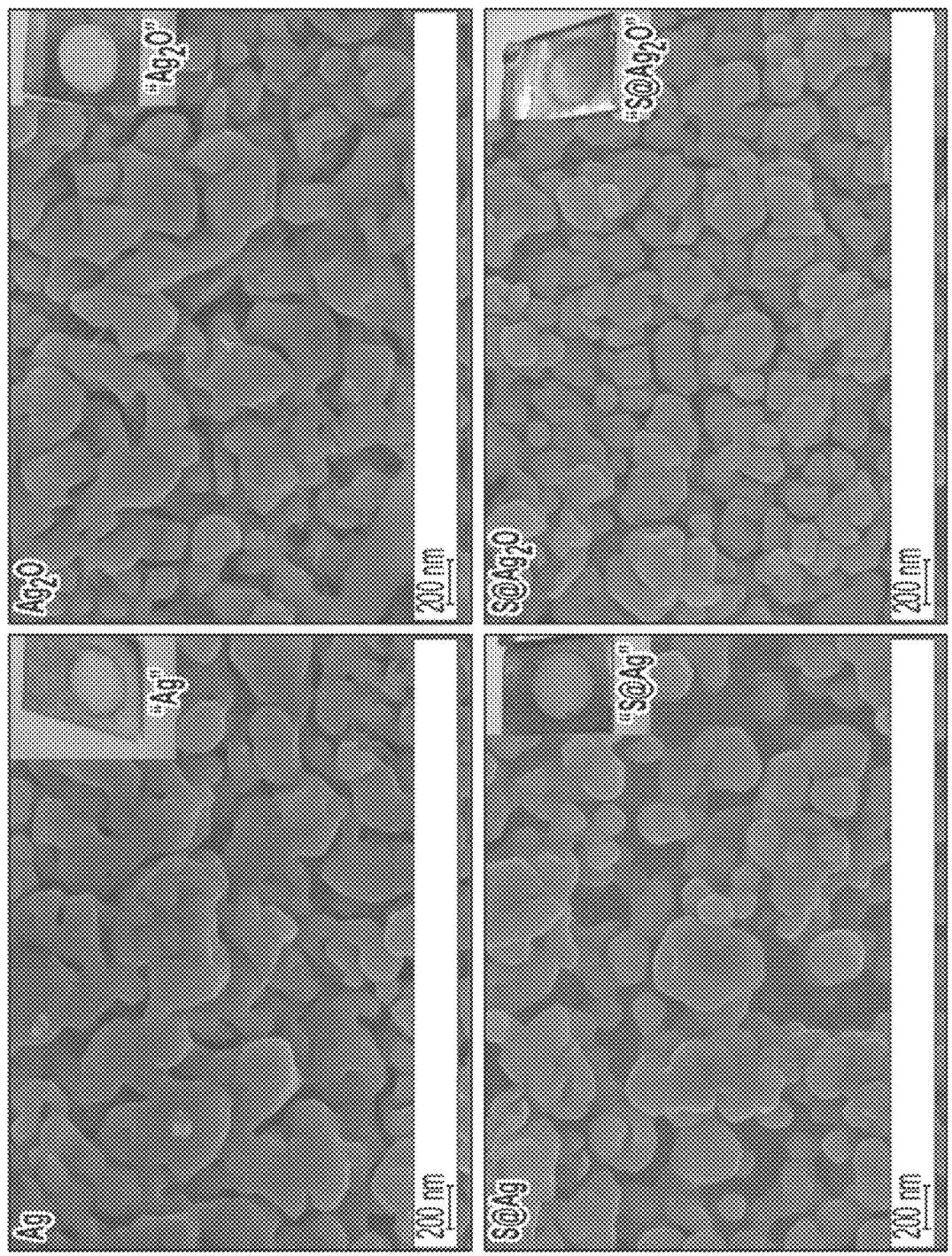
FIG. 5 shows scanning electron micrographs of silver foil electrodes with (S@Ag, S@$Ag_2O$) and without sulfidization (Ag, $Ag_2O$). Inset photographs show the cycled area (inner circle) for each electrode.

The composition and chemical speciation of the surface of the silver electrodes were examined by X-ray photoelectron spectroscopy (XPS), including sample sections from both uncycled (FIG. 3) and electrochemically cycled (FIG. 4) electrodes. These data confirm the presence of a primarily silver sulfide coating in the uncycled electrode that also persists after cycling in aqueous alkaline electrolyte. Some evolution of surface topology with cycling was observed, but with smaller average feature sizes forming at the sulfidized substrates (FIG. 5), possibly indicative of fewer deleterious dissolution events occurring at the sulfidized silver surface.

Figure 6A:
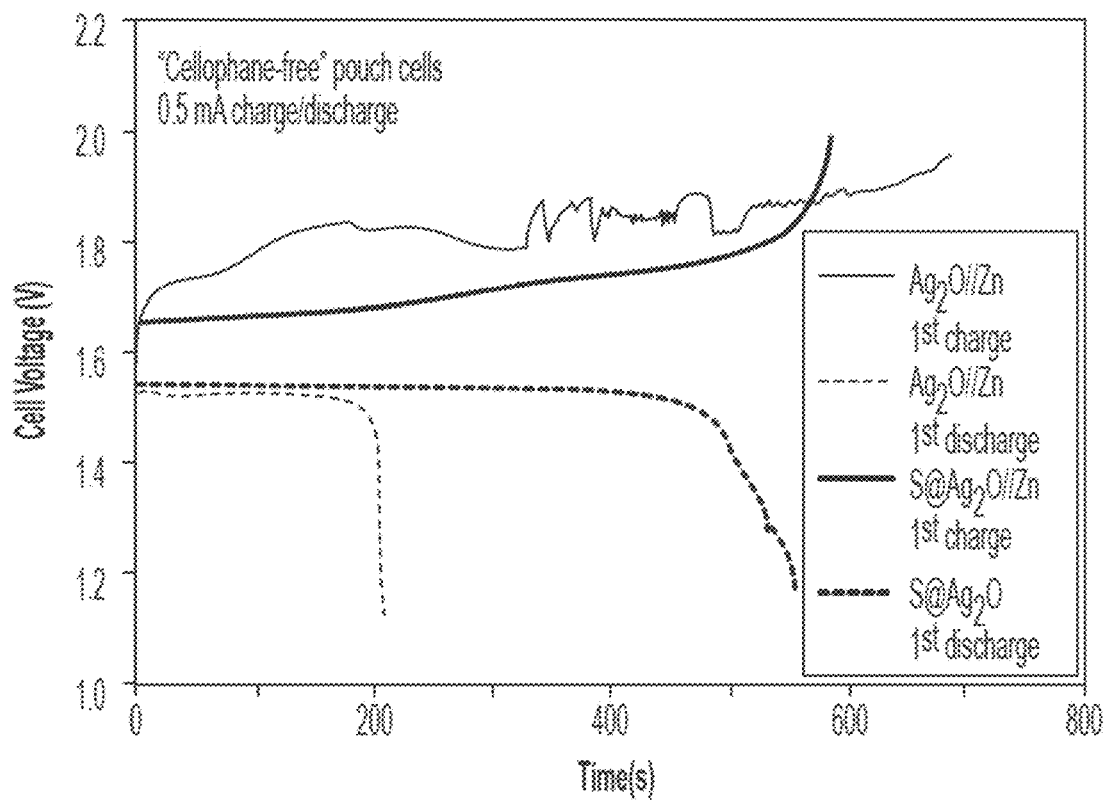
FIGS. 6A-B show galvanostatic charge/discharge for cellophane-free, silver-zinc pouch cells at 0.5 mA. Comparison of the first charge/discharge cycle for unmodified and sulfidized electrodes (FIG. 6A). Comparison of the charge/discharge behavior with a sulfidized silver electrode for selected cycles (FIG. 6B). Electrode size: ~1 $cm^2$. Both silver electrodes were oxidized prior to assembly and cycling.
Figure 6B:
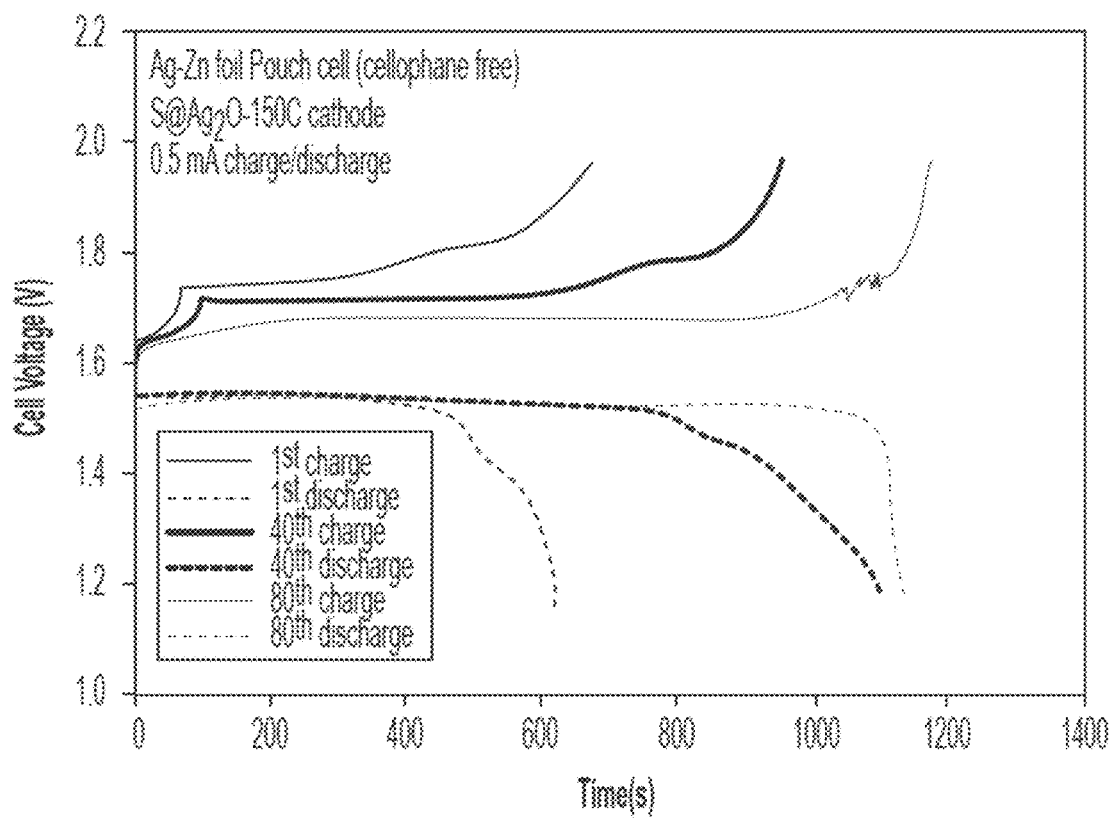
Figure 7A:
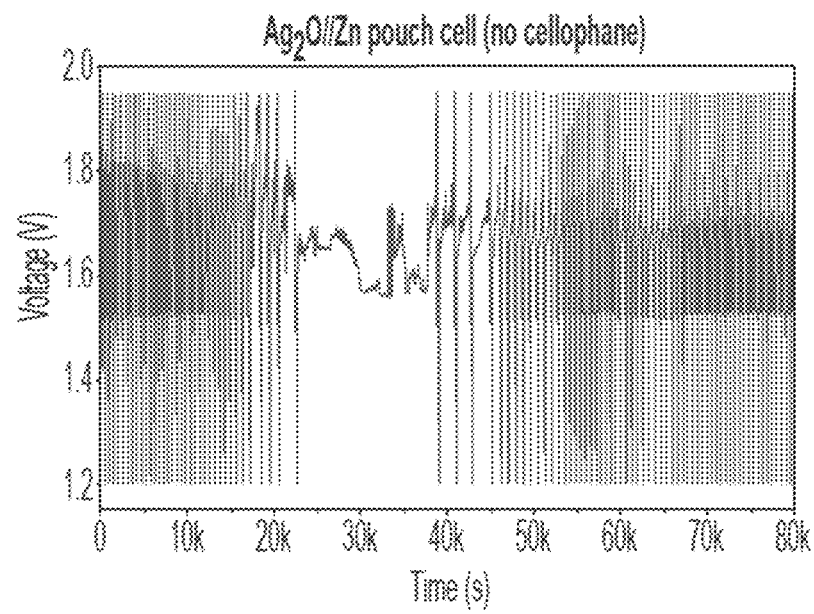
FIGS. 7A-B show galvanostatic charge/discharge for cellophane-free silver-zinc pouch cells at 0.5 mA with an unmodified silver-foil electrode (FIG. 7A) and a sulfidized silver-foil electrode (FIG. 7B). Both silver electrodes were oxidized prior to assembly and cycling.
Figure 7B:
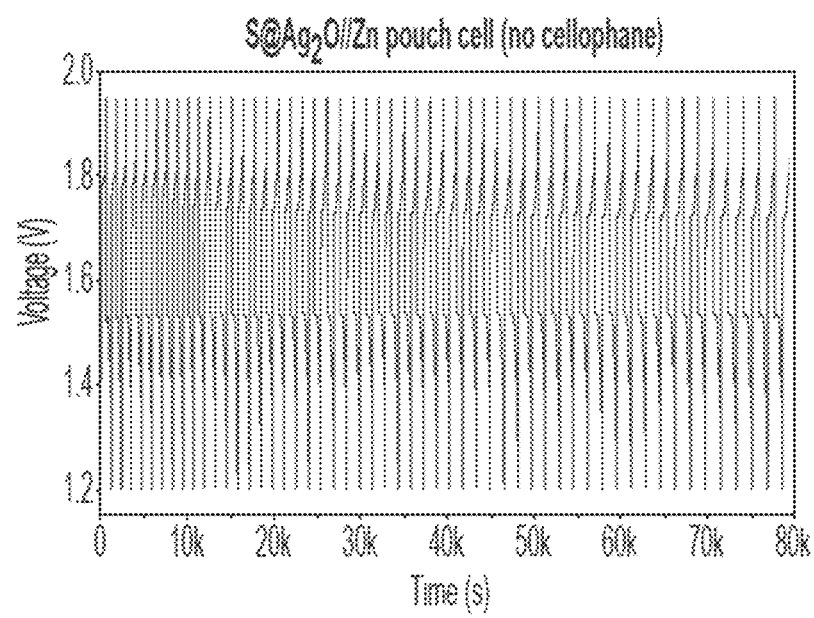
Figure 8:
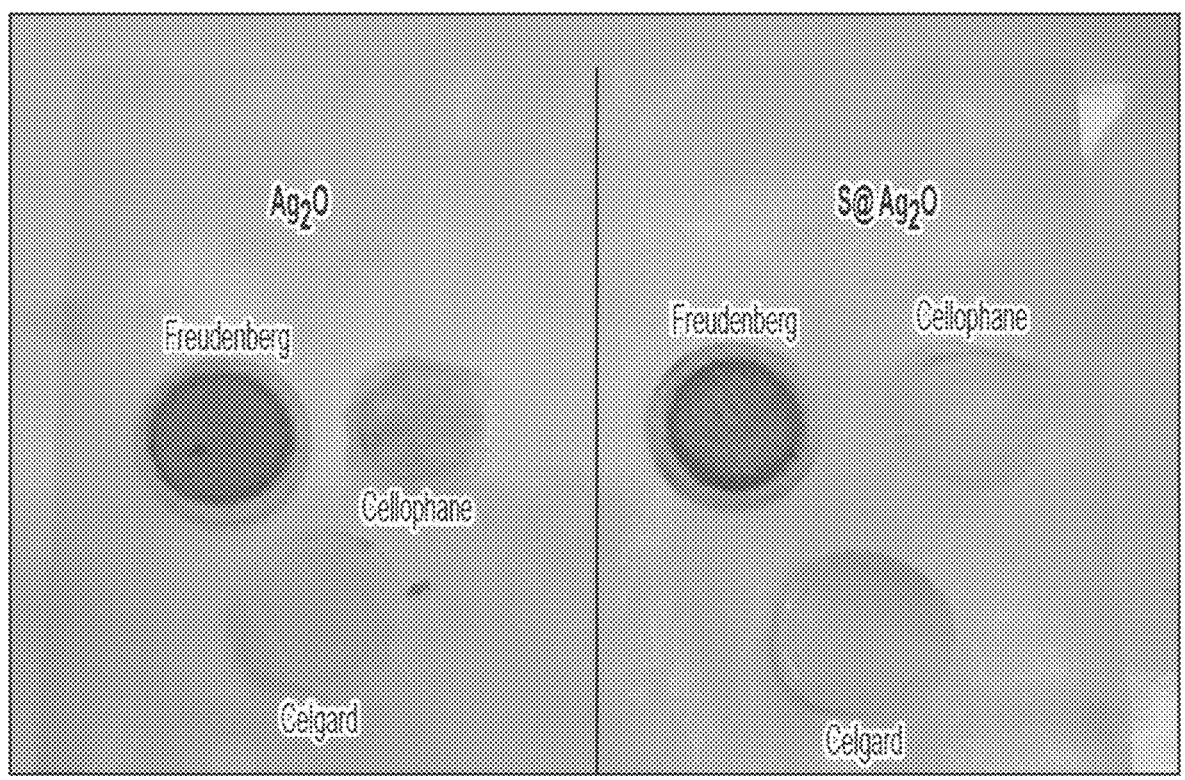
FIG. 8 shows a photograph of the separators in a silver-zinc coin cell after voltammetric cycling for (left) unmodified silver foil and (right) sulfidized silver foil. Both silver electrodes were oxidized prior to assembly and cycling.
Figure 9:
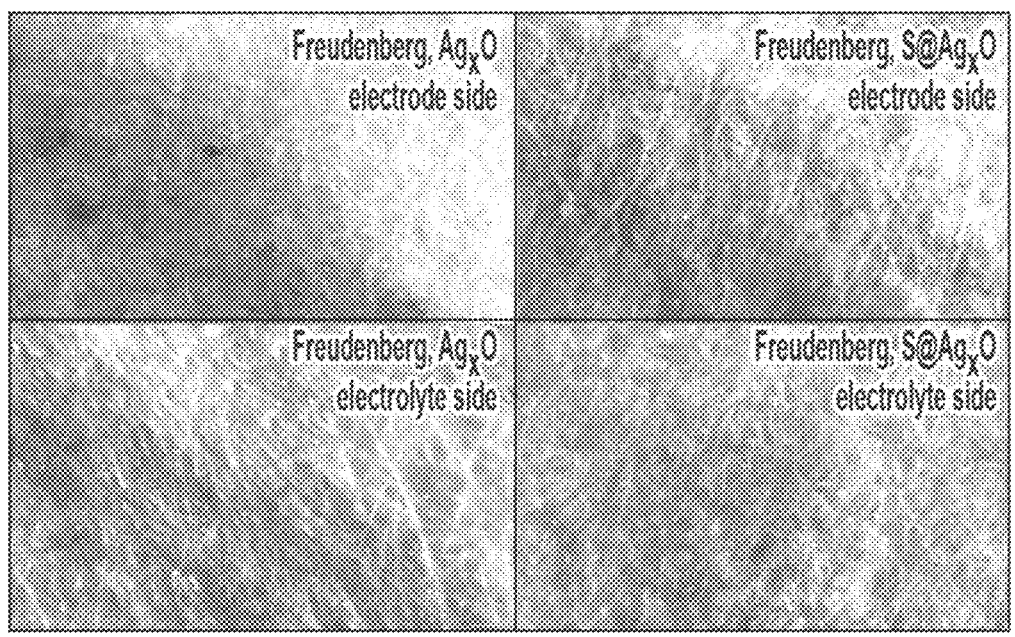
FIG. 9 shows optical micrographs of the Freudenberg nylon separator in a silver-zinc coin cell after voltammetric cycling for (left) unmodified silver foil and (right) sulfidized silver foil. Both silver electrodes were oxidized prior to assembly and cycling.

Electrochemical cycling of $Ag_2O$ and S@$Ag_2O$ electrodes was also conducted in simple pouch cells with zinc foil anodes to demonstrate the efficacy of sulfidized coatings at preventing silver crossover (FIG. 6). S@$Ag_2O$ electrodes demonstrated greatly improved coulombic efficiency and decreased polarization on the first cycle. Even after 80 cycles (traditional silver-zinc cells often fade after ~10 cycles), S@$Ag_2O$ maintains flat charge/discharge curves and high charge efficiency. Prolonged cycling of $Ag_2O$ and S@$Ag_2O$ in FIG. 7 shows the improved stability afforded by sulfidized coatings on silver electrodes. In a similar experiment, coin cells were constructed using $Ag_2O$ and S@$Ag_2O$ electrodes. After cycling, the separators were removed and dried for qualitative assessment of silver contamination. FIGS. 8 and 9 show significant yellowing of the Freudenberg and cellophane separators for the bare $Ag_2O$ electrodes from silver species whereas the S@Ag$_2$O electrodes show limited damage to the cellophane and instead only residual black powder from direct contact with the pressed pellet electrode.

Figure 10A:
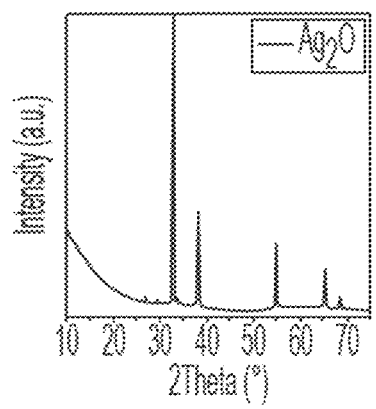
FIGS. 10A-C show powder X-ray diffraction (XRD) patterns of commercial silver(I) oxide (FIG. 10A), sulfidized silver(I) oxide powder (FIG. 10B), and silver sulfide (FIG. 10C).
Figure 10B:
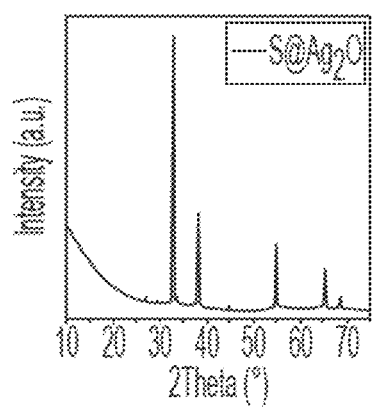
Figure 10C:
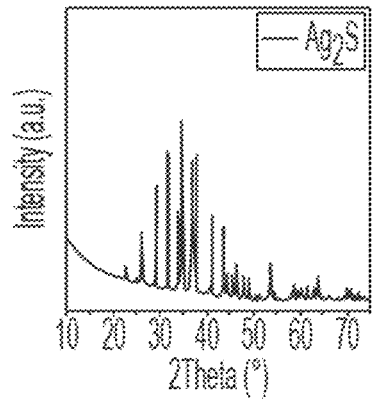
Figure 11:
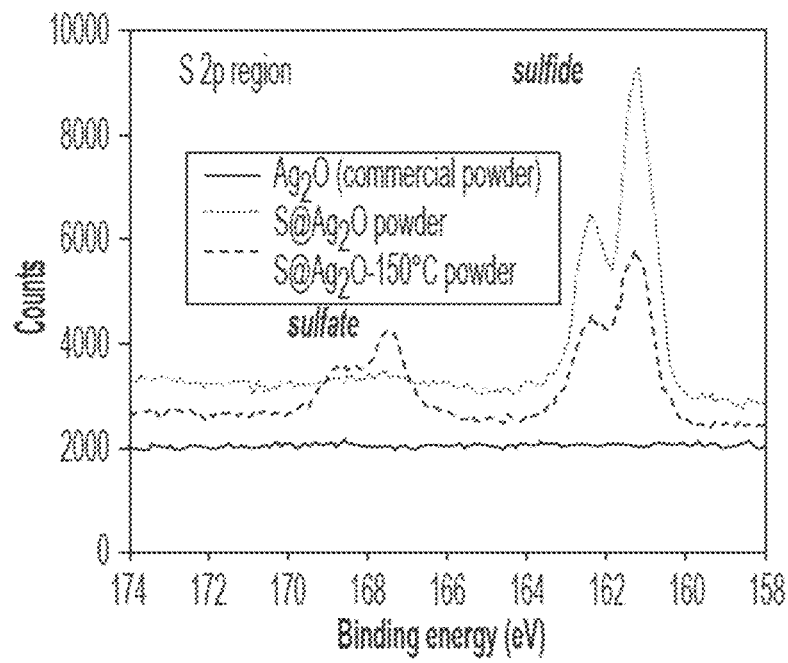
FIG. 11 shows X-ray photoelectron spectroscopy (XPS) in the S 2p region of unmodified, commercial silver-oxide powder, sulfidized silver-oxide powder, and sulfidized silver-oxide powder post-heat treatment at 150° C. for 1 hour in static air.
Figure 12:
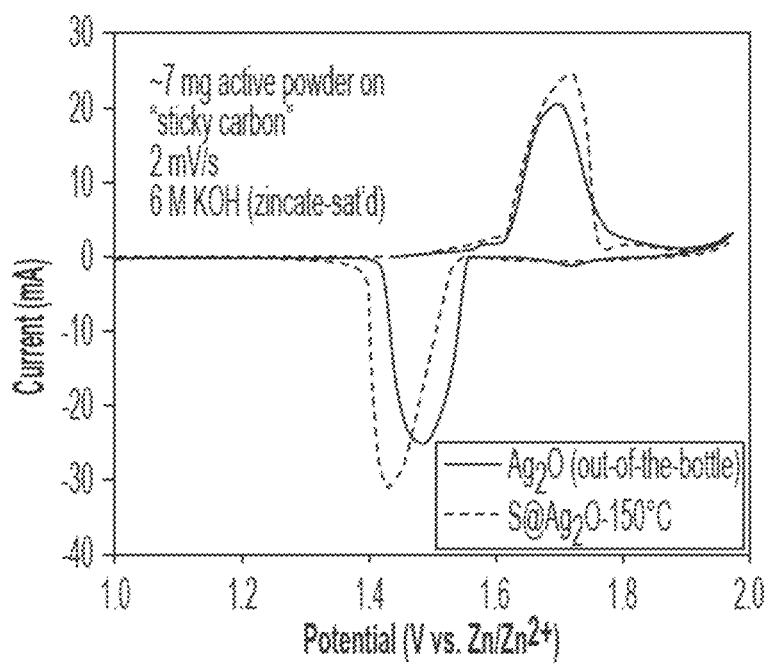
FIG. 12 shows cyclic voltammetry in a flooded cell of commercial silver-oxide powder and sulfidized silver-oxide powder after heat treatment at 150° C. for 1 hour in static air. Counter electrode: zinc foil.
Figure 13:
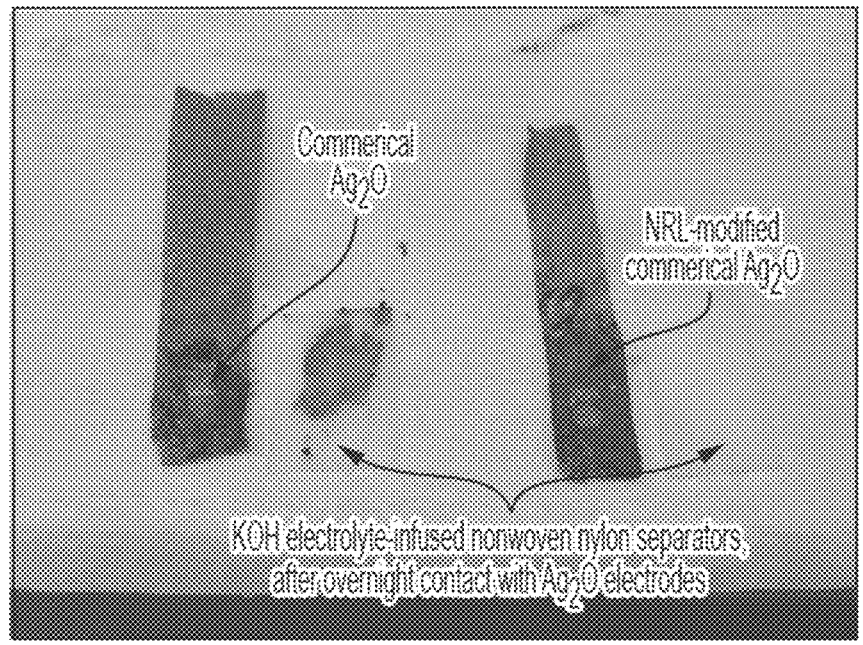
FIG. 13 shows a photograph of nickel-foam current collectors embedded with sticky carbon (carbon+eicosane wax) and silver-oxide powder with (right) and without (left) sulfidization. Separators were infused with 6 M KOH and left in contact with electrodes overnight to probe silver dissolution without applying an electrochemical driving force.
Figure 14:
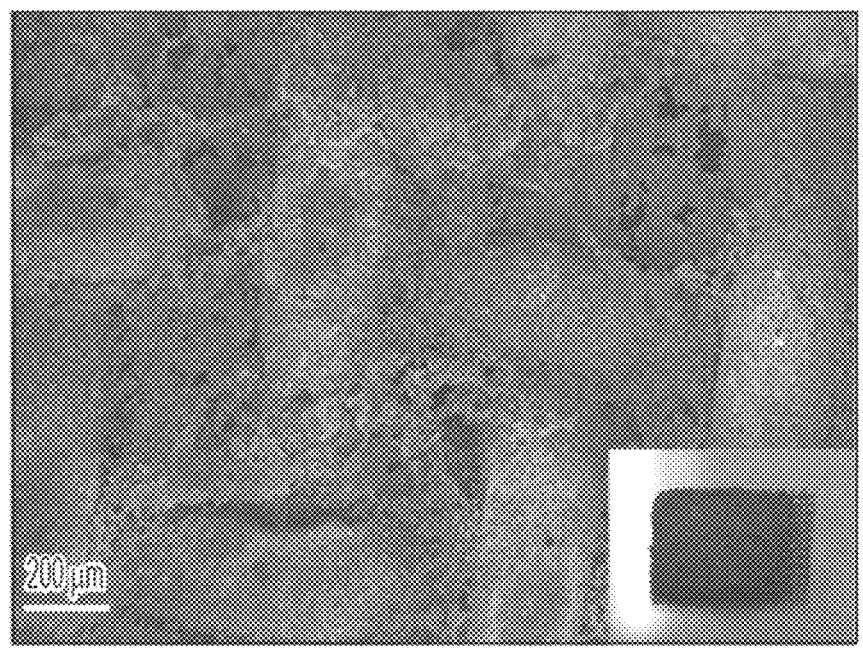
FIG. 14 shows a scanning electron micrograph and photograph (inset) of sulfidized silver sponge embedded within a metallic silver mesh.

Sulfidization of commercial silver (I) oxide powder yields a similar sulfur modification that affects primarily the silver-oxide surface and near surface, as evidenced by X-ray diffraction (FIG. 10) and X-ray photoelectron spectroscopy (FIG. 11). The voltammetric response of such sulfidized powders in alkaline electrolyte reveals enhanced peak current density and sharper redox peaks (FIG. 12). As seen for the silver foils described above, sulfidized silver (I) powder significantly lessens dissolution when in contact in alkaline electrolyte (FIG. 13). To demonstrate further practicality in a plausible electrode configuration, silver (I) oxide was embedded within a silver-mesh current collector and subsequently sulfidized (FIG. 14). This form factor retains the electrochemical advantages of having a porous silver electrode (U.S. Pat. No. 12,009,501) embedded within a current collector and the dissolution protection offered by sulfidization.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

The invention claimed is:

1. A battery comprising:
   a cathode comprising:
     a substrate comprising elemental silver and optionally silver oxide; and
     a silver sulfide coating on at least a portion of the substrate;
   an anode; and
   a separator between the cathode and the anode;
     wherein the separator comprises:
       a nylon layer in contact with the cathode; and
       a polypropylene layer in contact with the anode.

2. The battery of claim 1, wherein the cathode, the anode, or both are porous.

3. The battery of claim 1, wherein the cathode is a foil.

4. The battery of claim 1, wherein the cathode is a porous monolith.

5. The battery of claim 1, wherein the cathode is a powder.

6. The battery of claim 1, wherein the separator is free of cellophane.

7. A method comprising:
   providing the battery of claim 1;
   discharging the battery; and
   recharging the battery.

8. A method comprising:
   providing a solution of elemental sulfur in dimethyl sulfoxide; and
   submerging a substrate comprising elemental silver and optionally silver oxide in the solution to form silver sulfide on a surface of the substrate.

9. The method of claim 8, wherein the substrate is porous.

10. The method of claim 8, wherein the substrate is a foil.

11. The method of claim 8, wherein the substrate is a powder.

* * * * *